US012748803B2

(12) United States Patent
Balasubramanian et al.

(10) Patent No.: US 12,748,803 B2
(45) Date of Patent: Sep. 29, 2026

(54) COGNITIVE IMAGE SEARCHING BASED ON PERSONALIZED IMAGE COMPONENTS OF A COMPOSITE IMAGE

(71) Applicant: International Business Machines Corporation, Armonk, NY (US)

(72) Inventors: Swaminathan Balasubramanian, Troy, MI (US); Radha Mohan De, Howrah (IN); Mamnoon Jamil, Voorhees, NJ (US); Jian Wu, Mansfield, TX (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 17/479,172

(22) Filed: Sep. 20, 2021

(65) Prior Publication Data

US 2023/0093468 A1 Mar. 23, 2023

(51) Int. Cl.
*G06F 16/00* (2019.01)
*G06F 16/53* (2019.01)
*G06F 16/58* (2019.01)

(52) U.S. Cl.
CPC .............. *G06F 16/53* (2019.01); *G06F 16/58* (2019.01)

(58) Field of Classification Search
CPC ................................ G06F 16/53; G06F 16/58
(Continued)

(56) References Cited

U.S. PATENT DOCUMENTS 7,657,100 B2 * 2/2010 Gokturk .............. G06F 16/5838 382/209
7,657,126 B2 * 2/2010 Gokturk .............. G06F 16/5854 382/209
(Continued)

FOREIGN PATENT DOCUMENTS

CN 112313643 A 2/2021
CN 117980894 A 5/2024
(Continued)

OTHER PUBLICATIONS

Boland, M. "Google Lens: Organizing the World's Imagery." AR Insider. https://arinsider.co/2019/01/29/google-lens-organizing-the-worlds-imagery/ (Jan. 29, 2019), 14 pages.
(Continued)

*Primary Examiner* — Marc S Somers
*Assistant Examiner* — Rezwanul Mahmood
(74) *Attorney, Agent, or Firm* — Cantor Colburn LLP; Andre L. Adkins

(57) ABSTRACT

Embodiments of the invention are directed to a computer-implemented method of performing an electronic search. The computer-implemented method includes receiving, using a processor, a composite electronic image including a plurality of electronically identifiable objects, wherein the composite electronic image is associated with a user. The processor is used to segment the composite electronic image into sub-images by providing at least one of the sub-images for each of the plurality of electronically identifiable objects. For each of the sub-images, the processor is used to perform personalized sub-image search operations. The personalized sub-image search operations include selecting a sub-image-to-be-searched from among the sub-images; associating the sub-image-to-be-searched with personalized metadata of the user; and searching, based at least in part on the personalized
(Continued)

metadata of the user, a database to return a set of search images.

20 Claims, 11 Drawing Sheets

(58) Field of Classification Search
USPC .......................................................... 707/769
See application file for complete search history.

(56) References Cited

U.S. PATENT DOCUMENTS

| | | | | |
|---|---|---|---|---|
| 7,660,468 | B2 * | 2/2010 | Gokturk | G06F 16/5862 382/209 |
| 7,680,324 | B2 | 3/2010 | Boncyk et al. | |
| 7,716,157 | B1 | 5/2010 | Bourdev et al. | |
| 8,274,523 | B2 * | 9/2012 | Ptucha | G06T 11/60 707/769 |
| 8,345,982 | B2 | 1/2013 | Gokturk et al. | |
| 8,571,358 | B2 | 10/2013 | Zhao et al. | |
| 8,700,595 | B2 * | 4/2014 | Baird | G06F 16/245 707/706 |
| 9,008,435 | B2 | 4/2015 | Gokturk et al. | |
| 9,218,364 | B1 * | 12/2015 | Garrigues | G06F 16/50 |
| 9,230,223 | B2 * | 1/2016 | Cohen | G06Q 30/0631 |
| 9,582,156 | B2 * | 2/2017 | Battles | G06Q 30/0251 |
| 10,216,763 | B2 * | 2/2019 | Butterfield | G06F 16/907 |
| 10,339,404 | B2 * | 7/2019 | Greenberger | G06F 16/58 |
| 10,467,817 | B1 * | 11/2019 | Yip | G06F 3/0482 |
| 10,515,110 | B2 * | 12/2019 | Jing | G06F 16/2453 |
| 10,565,256 | B2 | 2/2020 | Badr et al. | |
| 10,684,738 | B1 * | 6/2020 | Sicora | G06F 3/04817 |
| 10,726,086 | B2 * | 7/2020 | Longbin | G06F 16/24578 |
| 10,789,622 | B2 * | 9/2020 | Ayush | G06F 18/2132 |
| 10,909,166 | B1 * | 2/2021 | Bogazzi | G06F 16/5838 |
| 10,956,967 | B2 * | 3/2021 | Ayush | G06Q 30/0631 |
| 11,030,240 | B1 * | 6/2021 | Janakiraman | G06F 16/7867 |
| 11,073,975 | B1 * | 7/2021 | Mueller | G06F 16/532 |
| 11,113,883 | B2 * | 9/2021 | Zia | G06T 19/006 |
| 11,127,213 | B2 * | 9/2021 | Zia | G06Q 30/0643 |
| 11,163,819 | B2 * | 11/2021 | Canelis | G06F 3/04845 |
| 11,176,189 | B1 * | 11/2021 | Hohwald | G06F 16/5866 |
| 11,210,508 | B2 * | 12/2021 | Miller | G06F 16/3331 |
| 11,216,506 | B1 * | 1/2022 | Ranzinger | G06F 16/56 |
| 11,314,827 | B2 * | 4/2022 | Zwebner | G06F 40/58 |
| 11,328,346 | B2 * | 5/2022 | Ramos | G06F 16/58 |
| 11,520,949 | B2 * | 12/2022 | Reynolds | G06F 30/27 |
| 11,644,947 | B1 * | 5/2023 | Sicora | G06F 3/04817 715/764 |
| 11,681,752 | B2 * | 6/2023 | Janakiraman | G06F 16/7328 707/722 |
| 2004/0071368 | A1 * | 4/2004 | Chadha | G06F 16/50 382/232 |
| 2006/0031486 | A1 * | 2/2006 | Miner | G06F 16/48 709/224 |
| 2008/0069480 | A1 * | 3/2008 | Aarabi | G06F 16/5854 707/E17.031 |
| 2008/0082426 | A1 * | 4/2008 | Gokturk | G06F 16/5838 707/E17.014 |
| 2009/0125482 | A1 * | 5/2009 | Peregrine | G06F 16/9035 |
| 2009/0254539 | A1 * | 10/2009 | Wen | G06F 16/583 707/999.005 |
| 2011/0025709 | A1 * | 2/2011 | Ptucha | G06T 11/60 345/667 |
| 2011/0029635 | A1 * | 2/2011 | Shkurko | G06F 16/54 348/E5.022 |
| 2014/0156704 | A1 * | 6/2014 | Jenkins | G06F 16/24575 707/772 |
| 2014/0233845 | A1 * | 8/2014 | Wagner | G06T 17/00 382/154 |
| 2015/0120719 | A1 * | 4/2015 | Aarabi | G06F 16/5838 707/728 |
| 2015/0134688 | A1 * | 5/2015 | Jing | G06F 16/2453 707/766 |
| 2017/0053186 | A1 * | 2/2017 | Allen | G06V 40/174 |
| 2018/0039700 | A1 * | 2/2018 | Greenberger | G06V 30/224 |
| 2018/0089229 | A1 * | 3/2018 | Li | G06F 16/24578 |
| 2018/0137201 | A1 * | 5/2018 | Longbin | G06F 16/24578 |
| 2018/0189325 | A1 * | 7/2018 | Hohwald | G06F 16/51 |
| 2018/0367835 | A1 * | 12/2018 | Hamidi-Rad | H04N 21/431 |
| 2019/0121879 | A1 * | 4/2019 | Canelis | G06F 3/04845 |
| 2019/0272336 | A1 * | 9/2019 | Ciecko | G06V 20/10 |
| 2019/0318405 | A1 * | 10/2019 | Hu | G06F 16/53 |
| 2019/0354609 | A1 | 11/2019 | Huang et al. | |
| 2019/0392055 | A1 | 12/2019 | Rose et al. | |
| 2020/0327149 | A1 * | 10/2020 | Brennenstuhl | G06F 16/2365 |
| 2020/0356592 | A1 * | 11/2020 | Yada | G06F 16/538 |
| 2021/0064612 | A1 * | 3/2021 | Huang | G06F 3/04815 |
| 2021/0064679 | A1 * | 3/2021 | Zwebner | G06F 40/30 |
| 2021/0073252 | A1 * | 3/2021 | Guo | G06F 16/3328 |
| 2021/0073272 | A1 * | 3/2021 | Garrett | G06N 20/00 |
| 2021/0165818 | A1 | 6/2021 | Matsushita | |
| 2021/0256060 | A1 * | 8/2021 | Janakiraman | G06F 16/7867 |
| 2021/0256061 | A1 * | 8/2021 | Janakiraman | G06F 16/7837 |
| 2021/0294834 | A1 * | 9/2021 | Mai | G06F 16/53 |
| 2021/0294835 | A1 * | 9/2021 | Koroa | G06F 16/538 |
| 2022/0050867 | A1 * | 2/2022 | Waller | G06F 16/51 |
| 2022/0101578 | A1 * | 3/2022 | Bedi | G06T 11/00 |
| 2022/0269895 | A1 * | 8/2022 | Barkan | G06F 16/53 |
| 2023/0093468 | A1 * | 3/2023 | Balasubramanian | G06F 16/535 707/769 |
| 2023/0205817 | A1 * | 6/2023 | Janakiraman | G06F 16/7837 707/722 |
| 2026/0105098 | A1 * | 4/2026 | Wu | G06F 16/53 |

FOREIGN PATENT DOCUMENTS

| | | | |
|---|---|---|---|
| EP | 4405828 | A1 | 7/2024 |
| JP | 2012-524343 | A | 10/2012 |
| JP | 2019-023923 | A | 2/2019 |
| JP | 2021-086438 | A | 6/2021 |
| JP | 2021-192241 | A | 9/2023 |
| JP | 2024-535035 | A | 9/2024 |
| KR | 2021-0005733 | A | 1/2021 |
| TW | 201610826 | A | 3/2016 |
| TW | I831229 | B | 2/2024 |
| WO | 2023/041648 | A1 | 3/2023 |

OTHER PUBLICATIONS

Eksombatchai, "An update on Pixie, Pinterest's recommendation system," Pinterest Engineering Blog, https://medium.com/pinterest-engineering/an-update-on-pixie-pinterests-recommendation-system-6f273f737e1b (Nov. 29, 2018). 8 pages.
Jing et al., "Visual Search at Pinterest." Proceedings of the 21th ACM SIGKDD International Conference on Knowledge Discovery and Data Mining. 2015. 10 pages.
Kislyuk et al. "Human curation and convnets: Powering item-to-item recommendations on pinterest." arXiv preprint arXiv:1511.04003 (2015) 6 pages.
Kislyuk, "Introducing automatic object detection to visual search," Pinterest Engineering Blog, https://medium.com/pinterest-engineering/introducing-automatic-object-detection-to-visual-search-e57c29191c30 (Jun. 28, 2016), 7 pages.
Lee et al., "Efficient object identification and localization for image retrieval using query-by-region." Computers & Mathematics with Applications 63.2 (2012): 511-517.
Microsoft Bing. "Object Detection for Visual Search in Bing." https://blogs.bing.com/search-quality-insights/2017-09/Object-Detection-in-Visual-Search (Sep. 19, 2017), 7 pages.
Yang et al., "Parallel content-based sub-image retrieval using hierarchical searching." Bioinformatics 30.7 (2014): 996-1002.
Gondra. "Personalized content-based image retrieval." Personalized Information Retrieval and Access: Concepts, Methods and Practices. IGI Global, 2008. 28 pages.
International Search Report and Written Opinion mailed Dec. 23, 2022 in PCT/EP2022/075650; 12 pages.

(56) References Cited

OTHER PUBLICATIONS

Smith et al. "VisualSEEk: a fully automated content-based image query system." Proceedings of the fourth ACM International conference on Multimedia. 1997. 12 pages.
International Search Report Search Report/Office Action mailed Aug. 30, 2023 in P202001501TW01; 8 pages.
European Patent Office, "EP Examination Report", Feb. 12, 2025, 08 pages, EP Application No 22786906.2.
Japan Patent Office, "Notice of Reasons for Refusal" Feb. 26, 2026, 09 Pages, JP Application No. 2024-516634.
European Patent Office, "Summons to attend oral proceedings pursuant to Rule 115(1) EPC", Jun. 1, 2026, 11 pages, EP Application No 22786906.2.

* cited by examiner

Equation (Eq.) A I = {curated-tags} U {crowd-sourced-tags} U {auto-tags} U {history-tags}

Equation (Eq.) B S = {user-Corpus-tags}

Equation (Eq.) C similarity score r = |I ∩ S| / |I Ú S|

Equation (Eq.) D rs = w1*(r) + w2*(area of sub-image/area of image) + w3*(relative position score)

where:
- the relative position score is computed using an inverse normalized function that measures the distance from the center of the sub-image to the center of the composite image; and
- w1, w2, w3 represent weighing associated with each score

FIG. 6B

COGNITIVE IMAGE SEARCHING BASED ON PERSONALIZED IMAGE COMPONENTS OF A COMPOSITE IMAGE

BACKGROUND

The present invention relates in general to programmable computers. More specifically, the present invention relates to computing systems, computer-implemented methods, and computer program products that cognitively perform image searches based on personalized image components or sub-images of a composite image.

Online search engines include search functionality that allows a user to perform so-called image searches based primarily on an image rather than a search query. A technique known as "reverse image search" is a content-based image retrieval (CBIR) query technique that involves providing a CBIR system with a sample image that, in effect, will be used as an image-based search query. Reverse image search is characterized by a lack of search terms, which removes the need for a user to guess at keywords or terms that may or may not return a correct result. Reverse image search allows users to discover content that is related to a specific sample image; the popularity of an image; manipulated versions; derivative works; and the like.

A composite image is an image that contains multiple different identifiable objects. For example, a single composite image can include a building; a car passing in front of the building; two people walking into the building; a tree next to the building; and the like. Object detection is a computer technology related to computer vision and image processing that deals with detecting instances of semantic objects of a certain class (e.g., humans, buildings, or cars) in digital images and videos. Object detection is widely used in computer vision tasks such as image annotation, vehicle counting, and activity recognition. Automatic image annotation is a process by which a computer system automatically assigns metadata in the form of captioning or keywords to a digital image, which enable automatic image annotation to be used in image retrieval systems to search, organize, and locate images of interest from a database.

SUMMARY

Embodiments of the invention are directed to a computer-implemented method of performing an electronic search. The computer-implemented method includes receiving, using a processor, a composite electronic image including a plurality of electronically identifiable objects, wherein the composite electronic image is associated with a user. The processor is used to segment the composite electronic image into sub-images by providing at least one of the sub-images for each of the plurality of electronically identifiable objects. For each of the sub-images, the processor is used to perform personalized sub-image search operations. The personalized sub-image search operations include selecting a sub-image-to-be-searched from among the sub-images; associating the sub-image-to-be-searched with personalized metadata of the user; and searching, based at least in part on the personalized metadata of the user, a database to return a set of search images.

Embodiments of the invention are also directed to computer systems and computer program products having substantially the same features as the computer-implemented method described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 6B depicts equations utilized by the system and flow diagram depicted in FIG. 6A;

Figure 1:
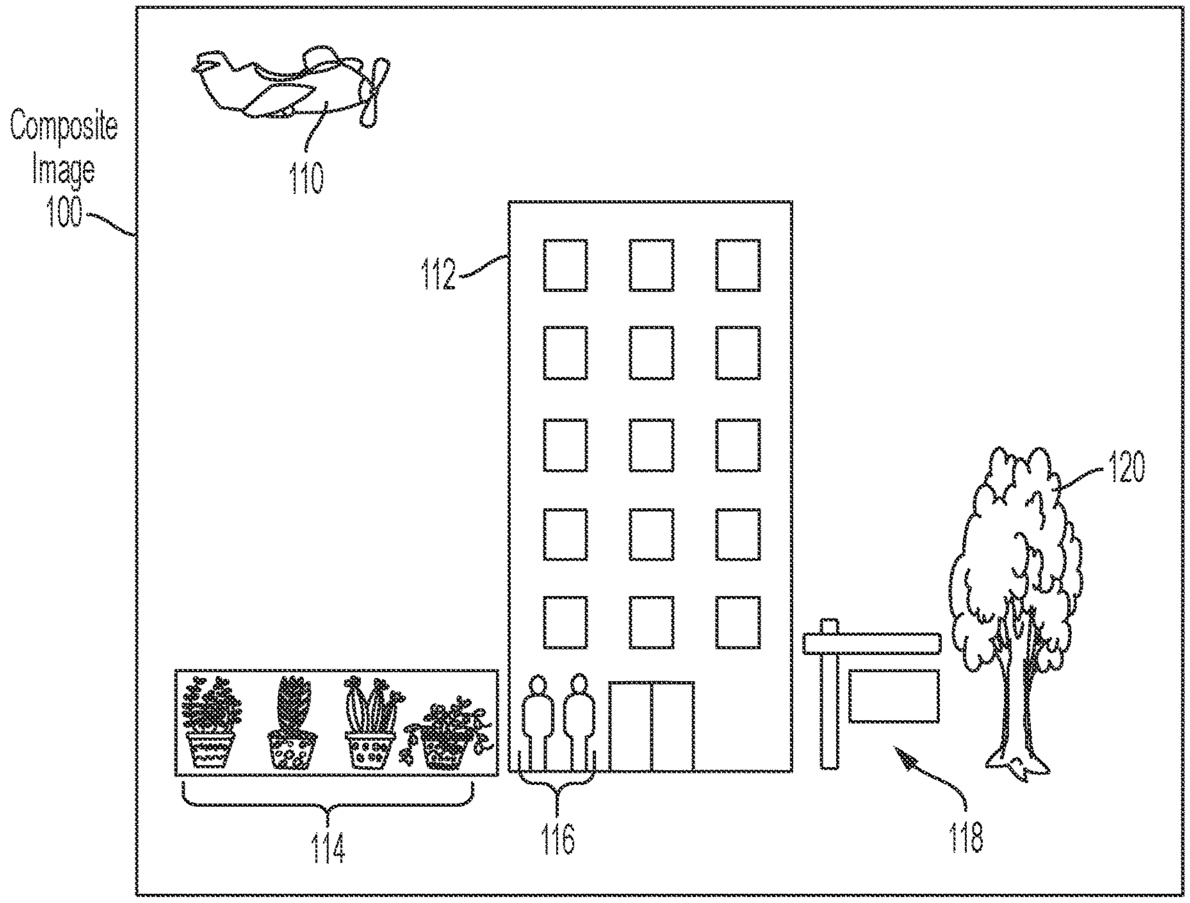
FIG. 1 depicts a composite image that can be input to a personalized sub-image search system in accordance with embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

The various components, modules, sub-function, and the like of the systems illustrated herein are depicted separately for ease of illustration and explanation. In embodiments of the invention, the operations performed by the various components, modules, sub-functions, and the like can be distributed differently than shown without departing from the scope of the various embodiments of the invention describe herein unless it is specifically stated otherwise.

For convenience, some of the technical operations described herein are conveyed using informal expressions. For example, a processor that has data stored in its cache memory can be described as the processor "knowing" the data. Similarly, a user sending a load-data command to a processor can be described as the user "telling" the processor to load data. It is understood that any such informal expressions in this detailed description should be read to cover, and a person skilled in the relevant art would understand such informal expressions to cover, the informal expression's corresponding more formal and technical function and operation.

The descriptions provided herein make reference to "images." It is understood that use of the term "image," unless specifically stated to the contrary, refers to electronic or digital representations of the image that can be analyzed by a computer, stored in memory, electronically transmitted, and displayed on computer display.

Turning now to an overview of technologies related to aspects of the invention, as previously noted herein, multiple different objects are often displayed within a given image. For example, a single image may include a building; a car passing in front of the building; two people walking into the building; a tree next to the building; and the like. An image that depicts multiple identifiable objects is referred to as a composite image. For composite images, known online search engines perform image searching by looking for images that are similar to the entire composite image. However, if a user is interested in searching only one or more objects in the composite image, known image searching techniques require the user to take multiple editing steps to create a new image where the object of interest to the user is the primary object then searching the edited image. It is known that "user experience" (UX) when interacting with computers is impacted by the amount of information that a user is required to enter into a system in order to have that system perform a particular task.

Turning now to an overview of aspects of the invention, embodiments of the invention improve UX in situations where a user wants to conduct an image search that is focused on particular objects in a composite image. Embodiments of the invention provide computing systems, computer-implemented methods, and computer program products that cognitively perform an image search based on computer-generated personalized image components or sub-images of a composite image. In accordance with aspects of the invention, the computing system is configured to cognitively determine the objects in the composite image that are of interest to the user without requiring that the user take actions to identify the objects of interest when submitting the image search request. For example, embodiments of the invention do not require a user who would like to perform an image search focused on one or more objects in a composite image to take multiple editing steps to create a new image where the object of interest to the user is the primary object.

In embodiments of the invention, in response to receiving a composite image and an image search request from a user, a computer system automatically performs object detection and image segmentation processes on the composite image to detect identifiable objects in the composite image and segment the composite image into sub-images, wherein each sub-image corresponds to at least one of the identifiable objects. Optionally, automatic image annotation can be applied to the sub-images to generate an initial assignment of descriptive metadata to the sub-images. A cognitive processor receives the sub-images and, optionally, the initial assignment of metadata. In accordance with aspects of the invention, the cognitive processor is provided with image processing and expression-based natural language processing capabilities. The natural language processing capability can be implemented using a robust expression-based cognitive data analysis technology such as IBM Watson®. IBM Watson® is an expression-based, cognitive data analysis technology that processes information more like a human than a computer, through understanding natural language, generating hypotheses based on evidence and learning as it goes. Additionally, expression-based, cognitive computer analysis provides superior computing power to keyword-based computer analysis for a number of reasons, including the more flexible searching capabilities of "word patterns" over "keywords" and the very large amount of data that may be processed by expression-based cognitive data analysis.

The cognitive processor in accordance with aspects of the invention analyzes the sub-image, the optional initial metadata, and a corpus of the user to perform a first cognitive analysis task of determining the level of relevance of the sub-image to the user; capturing that level of relevant in natural language; and incorporating the level of relevance into the metadata of the sub-image to create personalized metadata for the sub-image. In some aspects of the invention, the initial metadata can be used to augment or assist the cognitive processor in performing the task of determining the level of relevance of the sub-image to the user.

An image-based search engine performs an image search for each sub-image and its associated personalized metadata, such that a set of image search results is generated for each sub-image. The cognitive processor performs a second cognitive task of analyzing each sub-image, each sub-image's associated personalized metadata, and optionally the user's corpus to rank each sub-image based on its relevance level (or importance level) to the user. In embodiments of the invention, the relevance score of each sub-image can be a function of the relative size of the sub-image to the composite image; and the relative position of the sub-image within the composite image. Each ranked sub-image and its associated sets of search results can be presented to the user for review using, for example, a computer display. In some embodiments of the invention, the cognitive processor can be configured to only display sub-images having a ranking level (or importance level) above a threshold.

In some embodiments of the invention, the user can provide user feedback about the search results to the cognitive processor, and the user feedback can be stored and used to augment or improve future execution of the first and second cognitive processor tasks. In some embodiments of the invention, the user feedback can be derived from how the user interacts with the displayed search results. For example, if the user clicks immediately on the fourth ranked sub-image and its associated search results without clicking on any other sub-image's search results, the cognitive processor can determine that the fourth ranked sub-image was ranked too low. If the user clicks immediately on the top ranked sub-image and its associated search results without clicking on any other sub-image's search results, the cognitive processor can determine that the top ranked sub-image was ranked appropriately. In some embodiments of the invention, the cognitive processor can directly solicit user feedback by presenting questions about the ranking to the user through the display. For example, the cognitive processor could ask the user to input at the display the user's ranking of the top four sub-images ranked by the cognitive processor.

In some embodiments of the invention, the cognitive processor can evaluate the user feedback to determine whether or not the user feedback would improve the quality of the current image search. If the cognitive processor determines that the current image search can be improved by the user feedback, the cognitive processor can update its first and second cognitive tasks based on the user feedback then repeat the image search. In some embodiments of the invention, the above-described repeat of the image search can be offered as an options to the user and only executed if the user inputs a user approval.

In some embodiments of the invention, the first and second cognitive tasks can be performed prior to the image search such that the sub-images are ranked before they are searched. In some embodiments of the invention, the first and second cognitive tasks can be further augmented by the user inputting, along with the search image, a natural language identification of the object in the composite image that is of interest to the user. For example, the user could submit an image search request that includes the composite image and natural language text that reads "the flower in the bottom left corner." Because the cognitive processor includes natural language processing capabilities, UX is only minimally impacted because there is no need to require a specific format for the natural language identification of the object of interest. The cognitive processor would use its natural language processing capability to interpret the meaning of the text inputs and use that meaning to ensure that flowers in the bottom left corner of the composite image are included among the sub-images identified by the object detection process. The cognitive processor would also use the meaning of the text inputs to apply the appropriate ranking to the sub-image(s) that show the flowers.

In some embodiments of the invention, the cognitive processor can perform its tasks and other cognitive or evaluative operations using a trained classifier having image processing algorithms, machine learning algorithms, and natural language processing algorithms.

In some embodiments of the invention, natural language processing capabilities of the cognitive processor can include personalized Q&A functionality that is a modified version of known types of Q&A systems that provide answers to natural language questions. As a non-limiting example, the cognitive processor can include all of the features and functionality of the DeepQA technology developed by IBM®. DeepQA is a Q&A system that answers natural language questions by querying data repositories and applying elements of natural language processing, machine learning, information retrieval, hypothesis generation, hypothesis scoring, final ranking, and answer merging to arrive at a conclusion. Such Q&A systems are able to assist humans with certain types of semantic query and search operations, such as the type of natural question-and-answer paradigm of an educational environment. Q&A systems such as IBM's DeepQA technology often use unstructured information management architecture (UIMA), which is a component software architecture for the development, discovery, composition, and deployment of multi-modal analytics for the analysis of unstructured information and its integration with search technologies developed by IBM®. As applied to the cognitive processor tasks, the Q&A functionality can be used to answer inquiries such as what is the relevance of a given sub-image to the user, or what is the proper ranking of the sub-images based on the relevance of each sub-image to the user.

Turning now to a more detailed description of aspects of the invention, FIG. 1 depicts a composite image 100 that can be the subject of an analysis and image search performed by an image component cognitive search module 302 (shown in FIG. 3) in accordance with aspects of the invention. The composite image includes multiple objects, including an airplane 112, an apartment building 112, multiple flowerpots 114, two people 116, a sign (for sale, for rent, etc.) 118, and a tree 120, configured and arranged as shown.

Figure 2:
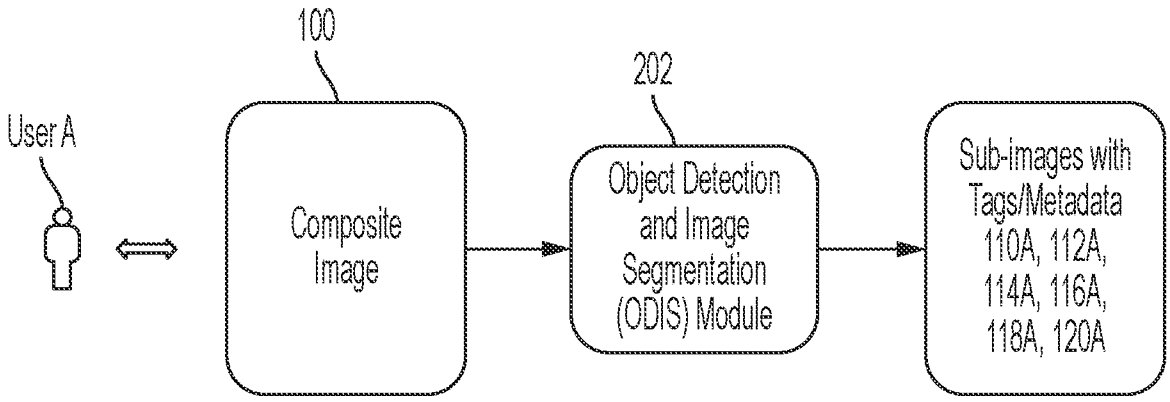
FIG. 2 depicts an object detection and image segmentation module that can be used in a personalized sub-image search system in accordance with embodiments of the invention.

FIG. 2 depicts an object detection and image segmentation (ODIS) module 202. In some embodiments of the invention, the ODIS module 202 can be incorporated within the cognitive search module 302 (shown in FIG. 3) and is configured to perform object detection and image segmentation operations on the composite image 100. The ODIS module 202 receives the composite image 100 from User-A, detects electronically identifiable objects in the composite image 100, and segments the composite image 100 into sub-images 112A, 114A, 115A, 118A, 120A (shown in FIG. 3), wherein each sub-image corresponds to at least one of the electronically identifiable objects. In general, an object is electronically identifiable when the object can be electronically recognized and categorized at a selected level of granularity. For example, even though a single leaf may be electronically identifiable, the granularity of the ODIS module 202 can be set such that a tree is identified as object but each individual leaf on the tree is not. Optionally, the ODIS module 202 can include automatic image annotation functionality that can be used to apply to the sub-images 112A, 114A, 116A, 118A, 120A an initial assignment of tags and/or descriptive metadata.

Figure 3:
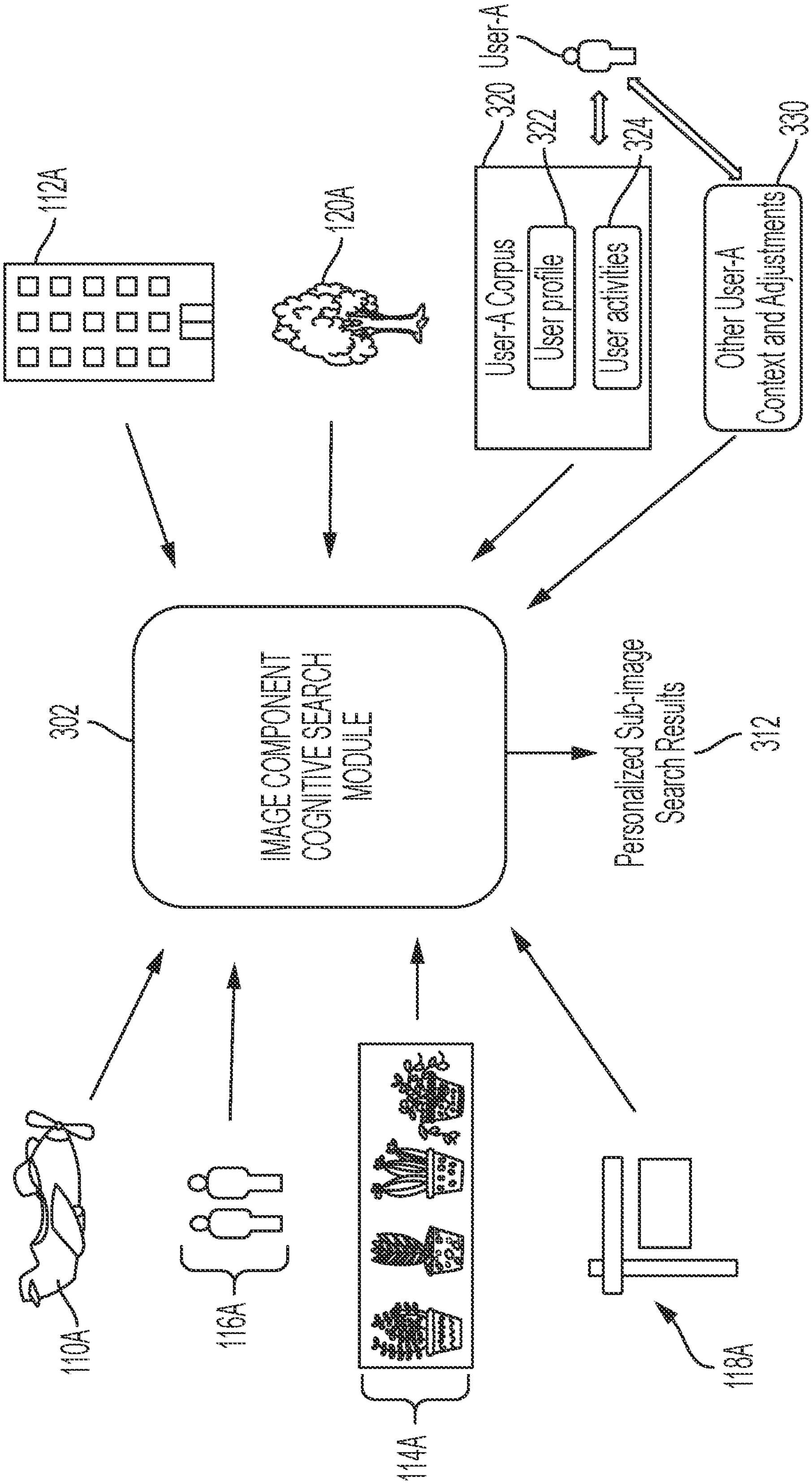
FIG. 3 depicts an image component cognitive search module that can be used in a personalized sub-image search system in accordance with embodiments of the invention.

FIG. 3 depicts the cognitive search module 302 and inputs to the cognitive image search module, including the sub-images 112A, 114A, 116A, 118A, 120A; a User-A corpus 320; and other User-A context & adjustments (OUCA) 330. The User-A corpus 320 includes a user profile 322 and user activities 324. The user profile 322 is completed by User-A and is a collection of settings and information associated with a User-A. The user profile 322 contains critical information that is used to identify User-A, such as User-A's name, age, photograph and individual characteristics such as knowledge or expertise. The user profile 322 can be downloaded from a profile used by User-A on User-A's social media sites. In some aspects of the invention, the user profile 322 can be constructed to elicit from User-A profile information that would assist in constructing the personalized tags 432, 442 and personalized metadata 434, 444 (all shown in FIG. 4B), including specifically profile information such as profession, hobbies, interests, music tastes, favorite authors, books read, and the like. The information in the user profile 322 is submitted voluntarily by User-A. The OUCA 330 can include “input image properties” such as focus, size of the composite image 100, and prominence of the sub-images within the composite image 100. The OUCA 330 can further include whether the object is the front versus the background of the composite image 100. The OUCA 330 can further include feedback from User-A on the current personalized sub-image search results 312. The OUCA 330 can further include historical composite image searches performed by the cognitive processor 202, as well as any overlap (e.g., common sub-images) between the current composite image search and other historical composite image searches. In accordance with aspects of the invention, the cognitive search module 302 analyzes the various inputs (110A, 112A, 114A, 116A, 118A, 120A, 320, 330) to generate personalized sub-image search results 312. A methodology 500 (shown in FIG. 5) depicts operations performed by the cognitive search module 302 to generate the personalized sub-image search results 312 in accordance with aspects of the invention. The methodology 500 is explained in greater detail subsequently herein in connection with the description of FIG. 5. A methodology 600 (shown in FIG. 6A) depicts operations performed by the cognitive search module 302 to generate the personalized sub-image search results 312 in accordance with aspects of the invention. The methodology 600 is explained in greater detail subsequently herein in connection with the description of FIG. 6A.

Figure 4A:
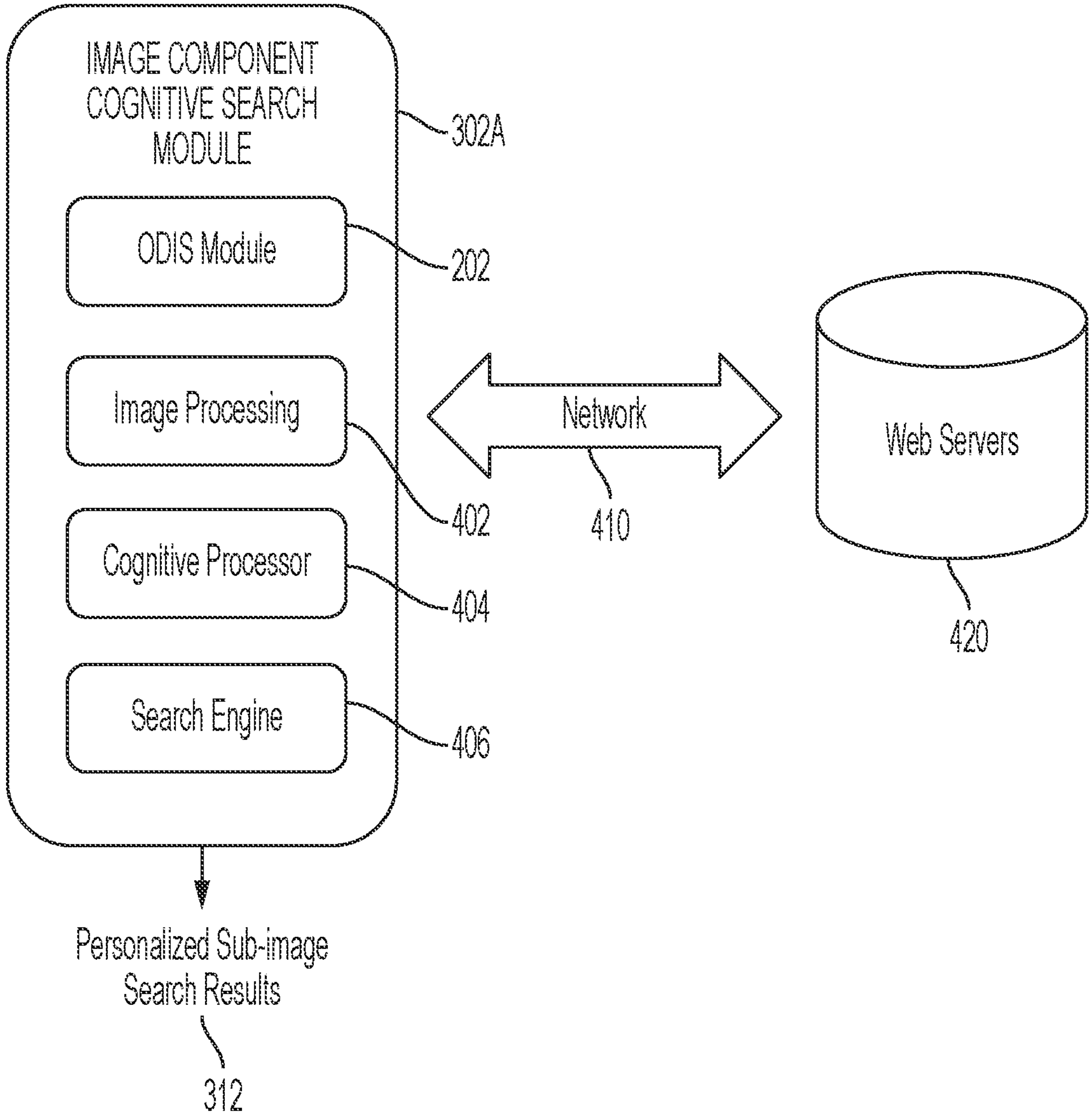
FIG. 4A depicts an image component cognitive search module that can be used in a personalized sub-image search system in accordance with embodiments of the invention.

FIG. 4A depicts a cognitive search module 302A in accordance with embodiments of the invention. The cognitive search module 302A can perform all of the operations performed by the cognitive search module 302 (shown in FIG. 3) but provides additional details of how the cognitive search module 302A can be implemented in accordance with embodiments of the invention. The cognitive search module 302A includes the ODIS module 202, an image processing module 402, a cognitive processor 404, and a search engine, configured and arranged as shown. All of the modules 202, 402, 404, 405 include expression-based natural language processing capabilities that can be used, where needed, to perform that module's functions in accordance with aspects of the invention. The natural language processing capability can be implemented using a robust expression-based cognitive data analysis technology such as IBM Watson®. IBM Watson® is an expression-based, cognitive data analysis technology that processes information more like a human than a computer, through understanding natural language, generating hypotheses based on evidence and learning as it goes. Additionally, expression-based, cognitive computer analysis provides superior computing power to keyword-based computer analysis for a number of reasons, including the more flexible searching capabilities of “word patterns” over “keywords” and the very large amount of data that may be processed by expression-based cognitive data analysis.

The ODIS 202 shown in FIG. 4A includes the same features and functionality as the ODIS 202 shown in FIG. 2. In some embodiments of the invention, the ODIS 202 can be external to the cognitive search module 302A or integrated within the cognitive search module 302A. The image processing module 402 provides image processing for the analysis performed by the cognitive processor 404 after the sub-images 110A, 112A, 114A, 116A, 118A, 120A have been generated. The cognitive processor 404 performs the primary cognitive analysis used to build the sub-images with personalized tags/metadata 430 (shown in FIG. 4) and the sub-images with personalized tags/metadata and user search guidance 440 (shown in FIG. 4), along with the primary cognitive analysis used to rank the sub-images with personalized tags/metadata 430 and the sub-images with personalized tags/metadata and user search guidance 440. The search engine 406 performs the image searches based on the sub-images with personalized tags/metadata 430 and/or the sub-images with personalized tags/metadata and user search guidance 440. The search engine 406 includes browser functionality that enables the search engine 406 to access a network 410 (e.g., a local network, a wide area network, the Internet, etc.) to pull data that matches the sub-images with personalized tags/metadata 430 and/or the sub-images with personalized tags/metadata and user search guidance 440 from a variety of web servers 420 representing a variety of location types such as blogs, forums, news sites, review sites, data repositories, and others.

Figure 4B:
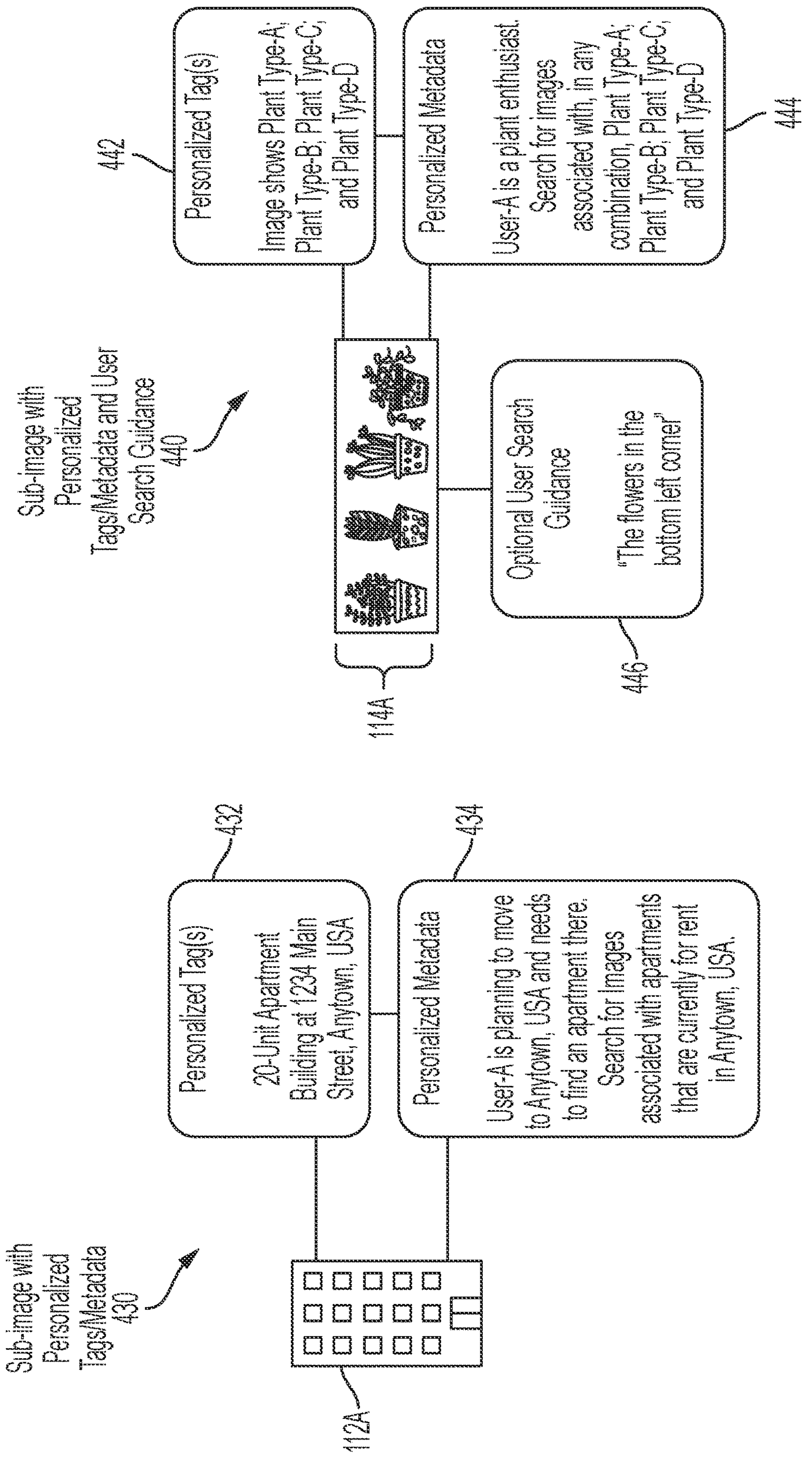
FIG. 4B depicts examples of sub-images with personalized tags/metadata generated in accordance with aspects of the invention.

FIG. 4B depicts details of the sub-images with personalized tags/metadata 430 and the sub-images with personalized tags/metadata and user search guidance 440, which are depicted as examples. Similar examples can be generated for the other sub-images of the composite image 100. In the example shown by the sub-images with personalized tags/metadata 430, the sub-image 112A has been processed by the ODS module 202, the image processing module 402, and the cognitive processor 404, and is now ready to be used by the search engine 406 to conduct an image search. Similarly, in the example shown by the sub-images with personalized tags/metadata and user search guidance 440, the sub-image 114A has been processed by the ODS module 202, the image processing module 402, and the cognitive processor 404, and is now ready to be used by the search engine 406 to conduct an image search. The sub-images with personalized tags/metadata 430 and the sub-images with personalized tags/metadata and user search guidance 440 are then ranked by the cognitive processor 404 and output by the cognitive search module 302A as the personalized sub-image search results 312.

Figure 5:
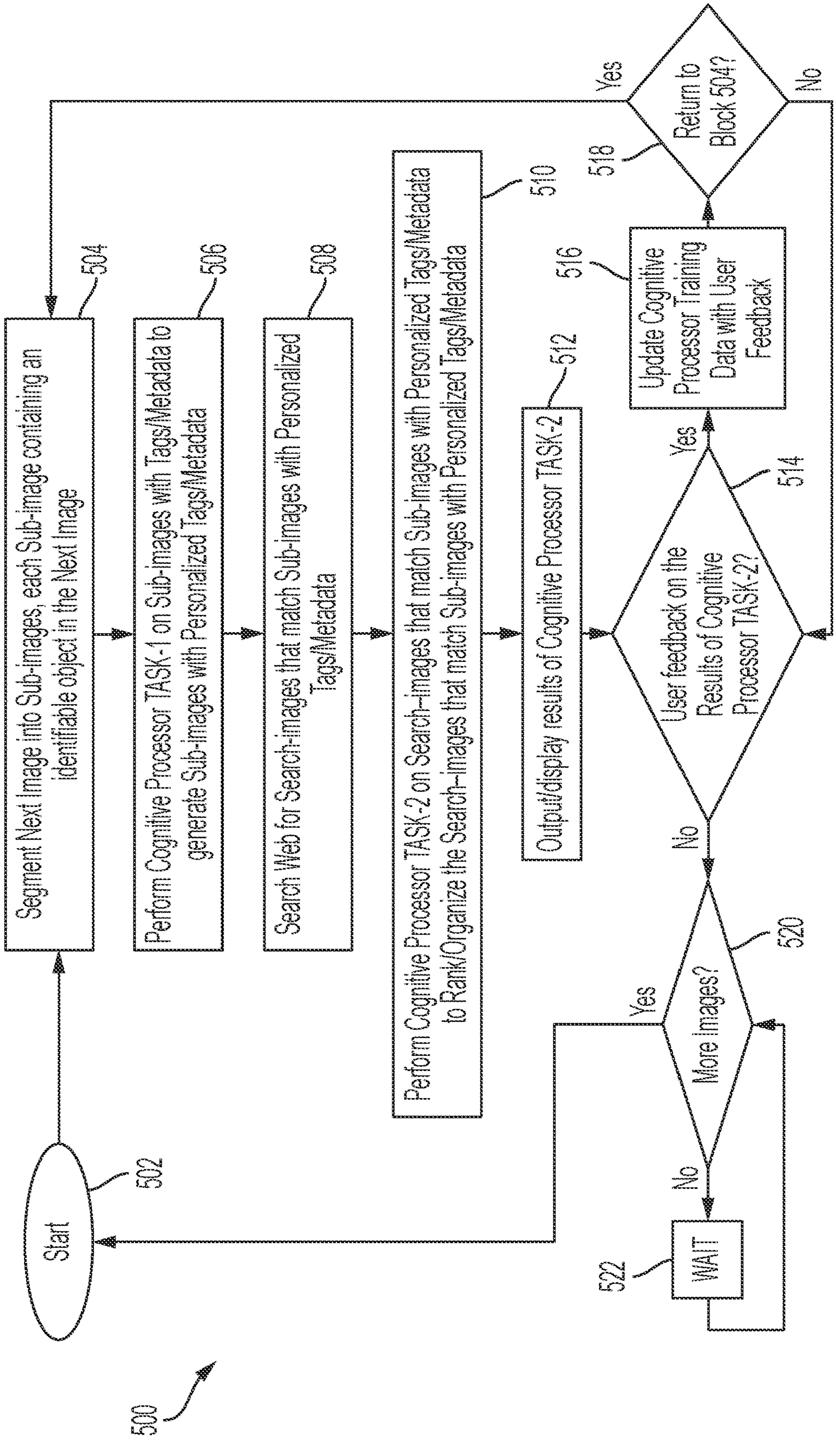
FIG. 5 depicts a flow diagram illustrating a methodology according to embodiments of the invention.

FIG. 5 depicts a computer-implemented methodology 500 in accordance with aspects of the invention. The methodology 500 can be performed by the cognitive search module 302, 302A (shown in FIGS. 3 and 4A). Where appropriate, the description of the methodology 500 will make reference to the corresponding elements of the modules 302, 302A. In accordance with aspects of the invention, the methodology 500 begins at “start” block 202 then moves to block 204 where the ODIS module 202 segments the composite image 100 into sub-images 112A, 114A, 116A, 118A, 120A, wherein each sub-image 112A, 114A, 116A, 118A, 120A contains an electronically identifiable object in the composite image 100. Optionally, the ODIS module 202 can apply automatic image annotation to the sub-images 112A, 114A, 116A, 118A, 120A to generate an initial assignment of descriptive metadata to the sub-images 112A, 114A, 116A, 118A, 120A. The methodology 500 then moves to block 506 where the cognitive processor 404 receives the sub-images 112A, 114A, 116A, 118A, 120A and, optionally, the initial assignment of metadata. In accordance with aspects of the invention, the cognitive processor 404 uses image processing and expression-based natural language processing capabilities to analyze the sub-image, the optional initial metadata, and the User-A corpus 320 to perform a first cognitive analysis task (TASK-1) of determining the level of relevance of the sub-image to User-A; capturing that level of relevant in natural language; and incorporating the level of relevance into the metadata of the sub-image to create personalized metadata for the sub-image. In some aspects of the invention, the initial metadata can be used to augment or assist the cognitive processor 404 in performing the task of determining the level of relevance of the sub-image to User-A.

At block 508, the search engine 406 performs an image search for each sub-image and its associated personalized metadata, such that a set of image search results is generated for each sub-image. At block 510, the cognitive processor 510 performs a second cognitive task (TASK-2) of analyzing each sub-image, each sub-image's associated personalized metadata, and optionally the User-A corpus to rank each sub-image based on its relevance level (or importance level) to User-A. At block 512, the cognitive processor displays each ranked sub-image and its associated sets of search results to the user for review using, for example, a computer display. In some embodiments of the invention, the cognitive processor can be configured to only display sub-images having a ranking level (or importance level) above a threshold.

At decision block 514, the methodology 500 determines whether or not the User-A has provided feedback about the search results to the cognitive processor 404. If the answer to the inquiry at decision block 514 is yes, at block 516 the user feedback is stored and used to augment or improve the analysis performed by the cognitive processor 404. For example, in embodiments of the invention where the cognitive processor 404 is implemented using the classifier 710 (shown in FIG. 7), the user feedback is used as additional training data of the classifier 710. In some embodiments of the invention, the user feedback can be derived from how User-A interacts with the displayed search results. In some embodiments of the invention, the cognitive processor 404 can directly solicit user feedback by presenting questions about the ranking to User-A through the display.

The methodology 500 then moves to decision block 518 to determine whether or not to return to decision block 514 to check for additional user feedback or return to block 504 to repeats the analysis of the current composite image 100. In some embodiments of the invention, the cognitive processor 404 can evaluate at decision block 518 the user feedback to determine whether or not the user feedback would improve the quality of the current image search. If the cognitive processor 404 determines at decision block 518 that the current image search can be improved by the user feedback, the cognitive processor 404 can update its first and second cognitive tasks based on the user feedback then repeat the image search by returning to block 504. In some embodiments of the invention, the above-described repeat of the image search can be offered as an options to User-A and only executed if the User-A inputs a user approval. In the answer to the inquiry at block 518 is no, the methodology 500 returns to decision block 514 to continue checking for user feedback. If no additional user feedback is received at decision block 514, the methodology 500 moves to decision block 520 to evaluate whether there are more composite images 100 to be submitted for search. If the answer to the inquiry at decision block 520 is no, the methodology 500 moves to block 522, waits, then returns to decision block 520. If the answer to the inquiry at decision block 520 is yes, the methodology 500 returns to block 502.

In some embodiments of the invention, the first and second cognitive tasks can be performed prior to the image search such that the sub-images are ranked before they are searched. In some embodiments of the invention, the first and second cognitive tasks can be further augmented by User-A inputting, along with the search image, a natural language identification of the object in the composite image that is of interest to the user (e.g., as shown by the sub-image with personalized tags/metadata and user search guidance 440 shown in FIG. 4B).

Figure 6A:
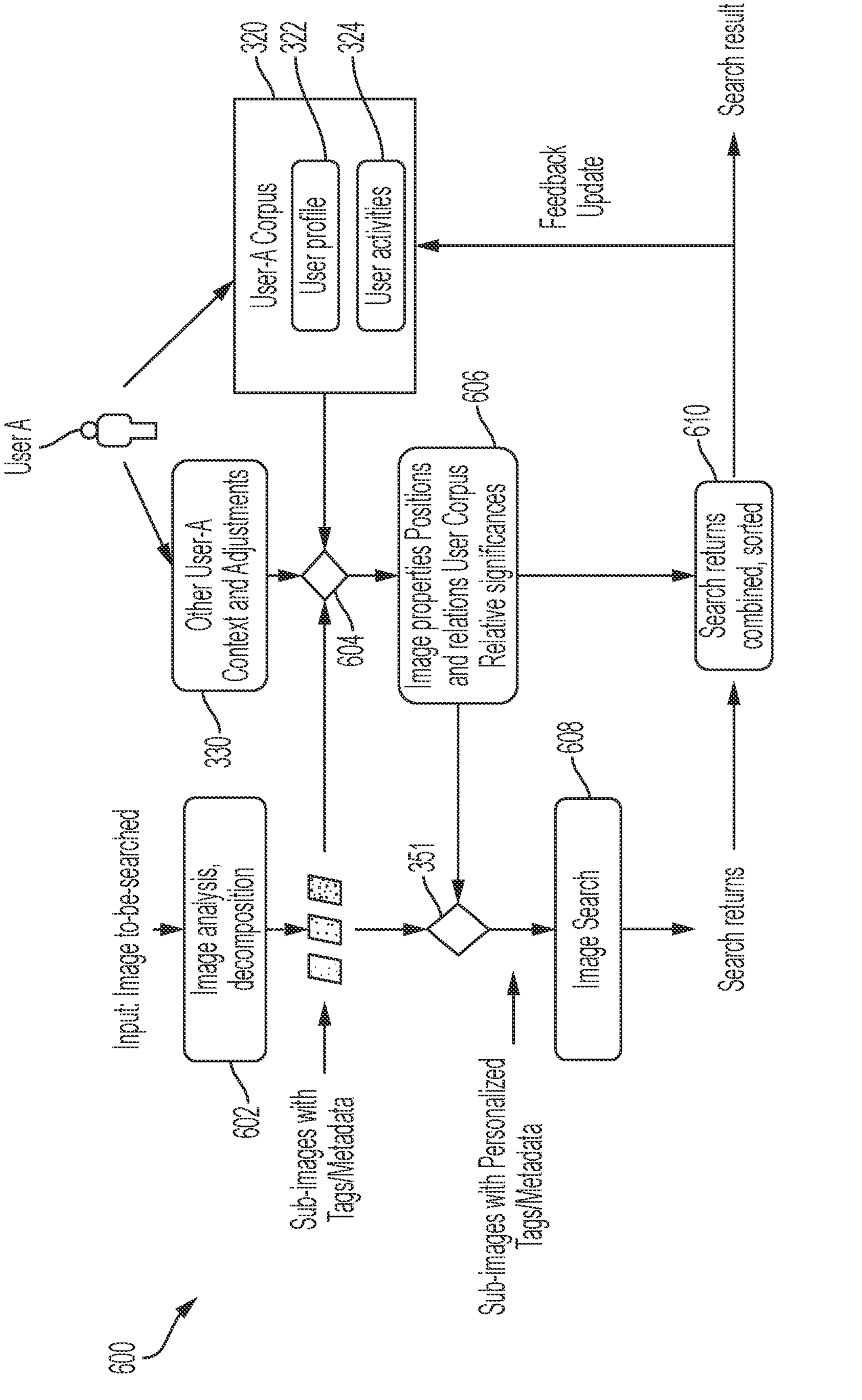
FIG. 6A depicts a combined block diagram and flow diagram illustrating a personalized sub-image search system in accordance with embodiments of the invention.

FIG. 6A depicts a computer-implemented methodology 500 in accordance with aspects of the invention, and FIG. 6B depicts Equations A-D that can be utilized in the methodology 600. The methodology 600 can be performed by the cognitive search module 302, 302A (shown in FIGS. 3 and 4A). Where appropriate, the description of the methodology 600 will make reference to the corresponding elements of the modules 302, 302A. In accordance with aspects of the invention, User-A inputs a composite image 100 to the cognitive search module 302, 302A. At block 602, the methodology 600 identifies different discrete sub-images 112A, 114A, 116A, 118A, 120A within the composite image 100 using image recognition techniques. At block 604, the methodology 600 creates personalized tags and metadata based on the OUCA 330 and the User-A corpus 320. At block 606, the methodology 600 identifies and assigns the relative significance of each sub-image 112A, 114A, 116A, 118A, 120A within the composite image 100 based on many contextual factors such as listed in block 606, as well as any of the OUCA 330 and/or the User-A corpus 320. Block 606 optionally allows the User-A to modify the relative significance of the sub-images 112A, 114A, 116A, 118A, 120A by circling one or of the two sub-images 112A, 114A, 116A, 118A, 120A or portions of the sub-images 112A, 114A, 116A, 118A, 120A.

At block 608, the search engine 406 conducts an image search based on the sub-images with personalized tags/metadata. At block 610, the search returns output by the search engine 406 at block 608 are combined to sort and prioritize based on relative importance. The search results generated at block 610 are then presented to User-A. User-A provides feedback on the search results in the form of opening the links, zooming of certain portions, any downloads, modifying the searches in the subsequent pages or subsequent searches.

In embodiments of the invention, the OUCA 330 is built from a number of inputs including but not limited to user profile and interests; history of images searched; and history of non-image related actions (documents, browsing, etc.). In some embodiments of the invention, the context is built as a set of tags. This set is constantly updated with new information as the methodology 600 "learns" from user activities.

In embodiments of the invention, each sub-image 112A, 114A, 116A, 118A, 120A can be scored against user context. Each sub-image can be assigned one or more tags such as the curated tags assigned by a photographer of the composite image 100; crowd-sourced tags assigned by one or several "friends" of User-A on a social network; auto-generated tags assigned by an image recognition algorithms; and tags from User-A's history, which are used by User-A for a similar composite image or similar sub-image.

Once tag assignment completes, known tag stemming techniques are used to add related tags. A union function is applied to all of the tags. A relevancy score is computed between "I" (the sub-image tags) and "C" (the user context tags). The relevancy score is computed using a jaccard index as shown by Equations A-C shown in FIG. 6B. The final relevance score of each sub-image is a function of a similarity score; the relative size of the sub-image to the composite image; and the relative position of the sub-image within the composite image. The final relevance sore can be computed using the linear weighted function shown at Equation D in FIG. 6B.

Additional details of machine learning techniques that can be used to aspects of the invention disclosed herein will now be provided. The various types of computer control functionality of the processors described herein can be implemented using machine learning and/or natural language processing techniques. In general, machine learning techniques are run on so-called "neural networks," which can be implemented as programmable computers configured to run sets of machine learning algorithms and/or natural language processing algorithms. Neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

The basic function of neural networks and their machine learning algorithms is to recognize patterns by interpreting unstructured sensor data through a kind of machine perception. Unstructured real-world data in its native form (e.g., images, sound, text, or time series data) is converted to a numerical form (e.g., a vector having magnitude and direction) that can be understood and manipulated by a computer. The machine learning algorithm performs multiple iterations of learning-based analysis on the real-world data vectors until patterns (or relationships) contained in the real-world data vectors are uncovered and learned. The learned patterns/relationships function as predictive models that can be used to perform a variety of tasks, including, for example, classification (or labeling) of real-world data and clustering of real-world data. Classification tasks often depend on the use of labeled datasets to train the neural network (i.e., the model) to recognize the correlation between labels and data. This is known as supervised learning. Examples of classification tasks include identifying objects in images (e.g., stop signs, pedestrians, lane markers, etc.), recognizing gestures in video, detecting voices, detecting voices in audio, identifying particular speakers, transcribing speech into text, and the like. Clustering tasks identify similarities between objects, which it groups according to those characteristics in common and which differentiate them from other groups of objects. These groups are known as "clusters."

An example of machine learning techniques that can be used to implement aspects of the invention will be described with reference to FIGS. 7 and 8. Machine learning models configured and arranged according to embodiments of the invention will be described with reference to FIG. 7. Detailed descriptions of an example computing system and network architecture capable of implementing one or more of the embodiments of the invention described herein will be provided with reference to FIG. 9.

Figure 7:
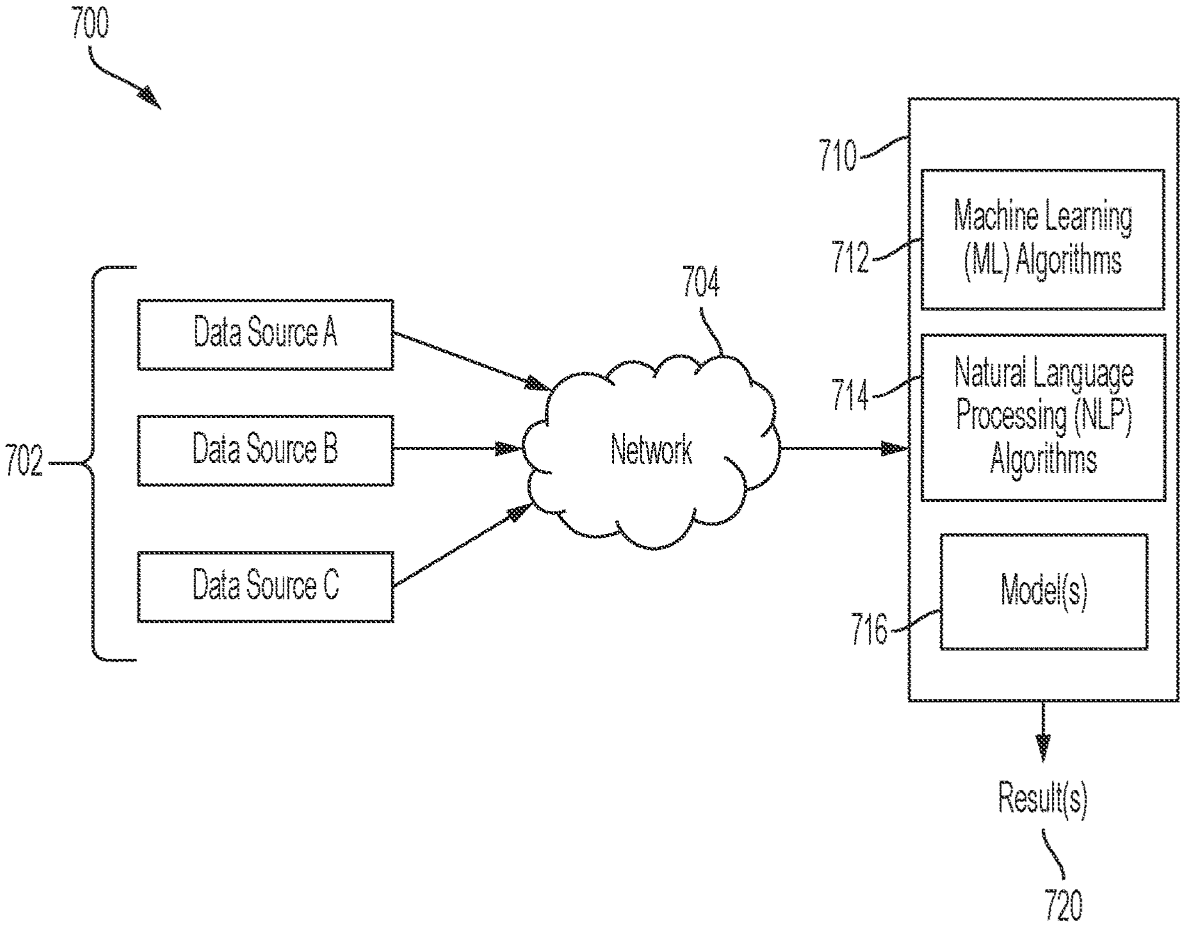
FIG. 7 depicts a machine learning system that can be utilized to implement aspects of the invention.

FIG. 7 depicts a block diagram showing a classifier system 700 capable of implementing various aspects of the invention described herein. More specifically, the functionality of the system 700 is used in embodiments of the invention to generate various models and sub-models that can be used to implement computer functionality in embodiments of the invention. The system 700 includes multiple data sources 702 in communication through a network 704 with a classifier 710. In some aspects of the invention, the data sources 702 can bypass the network 704 and feed directly into the classifier 710. The data sources 702 provide data/information inputs that will be evaluated by the classifier 710 in accordance with embodiments of the invention. The data sources 702 also provide data/information inputs that can be used by the classifier 710 to train and/or update model(s) 716 created by the classifier 710. The data sources 702 can be implemented as a wide variety of data sources, including but not limited to, sensors configured to gather real time data, data repositories (including training data repositories), and outputs from other classifiers. The network 704 can be any type of communications network, including but not limited to local networks, wide area networks, private networks, the Internet, and the like.

Figure 9:
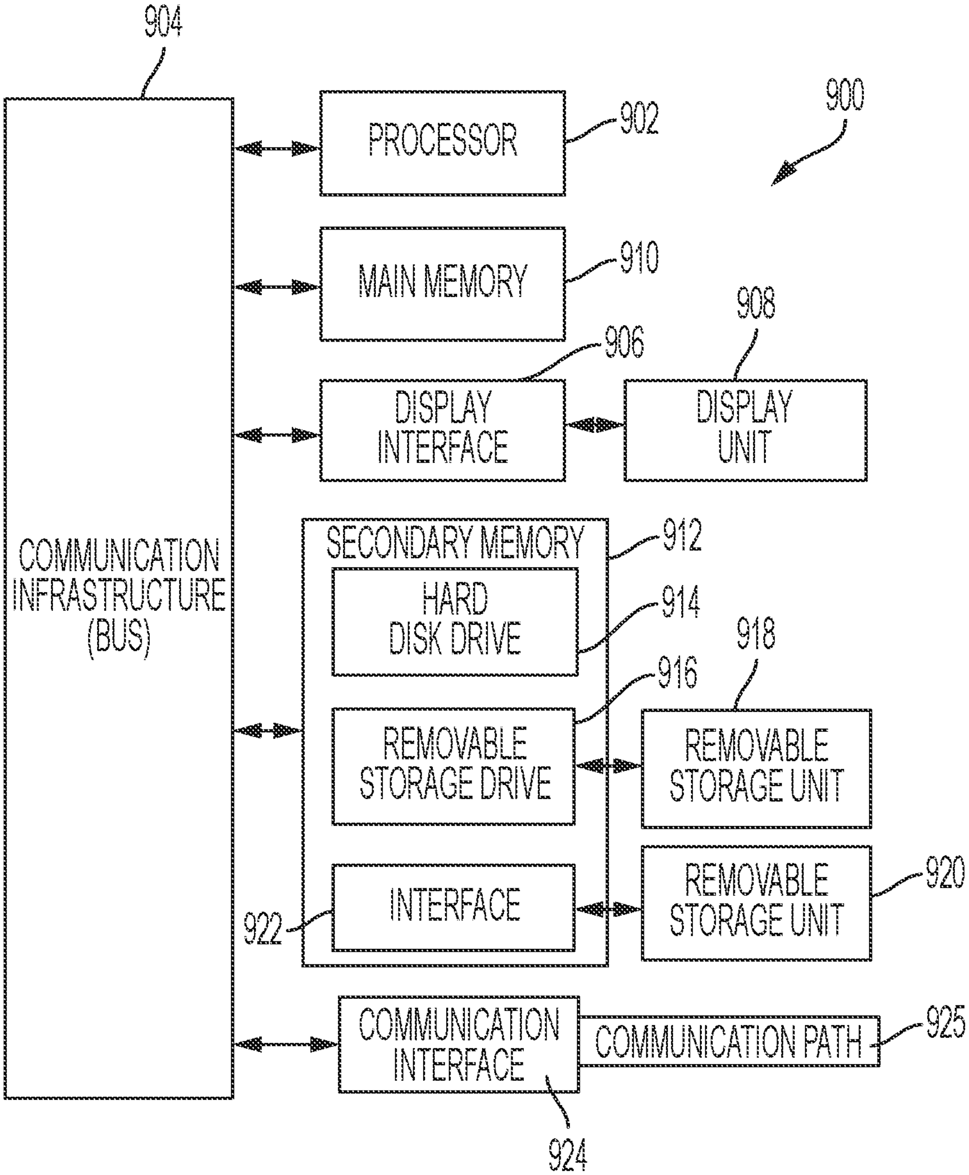
FIG. 9 depicts details of an exemplary computing system capable of implementing various aspects of the invention.

The classifier 710 can be implemented as algorithms executed by a programmable computer such as a processing system 900 (shown in FIG. 9). As shown in FIG. 7, the classifier 710 includes a suite of machine learning (ML) algorithms 712; natural language processing (NLP) algorithms 714; and model(s) 716 that are relationship (or prediction) algorithms generated (or learned) by the ML algorithms 712. The algorithms 712, 714, 716 of the classifier 710 are depicted separately for ease of illustration and explanation. In embodiments of the invention, the functions performed by the various algorithms 712, 714, 716 of the classifier 710 can be distributed differently than shown. For example, where the classifier 710 is configured to perform an overall task having sub-tasks, the suite of ML algorithms 712 can be segmented such that a portion of the ML algorithms 712 executes each sub-task and a portion of the ML algorithms 712 executes the overall task. Additionally, in some embodiments of the invention, the NLP algorithms 714 can be integrated within the ML algorithms 712.

The NLP algorithms 714 include speech recognition functionality that allows the classifier 710, and more specifically the ML algorithms 712, to receive natural language data (text and audio) and apply elements of language processing, information retrieval, and machine learning to derive meaning from the natural language inputs and potentially take action based on the derived meaning. The NLP algorithms 714 used in accordance with aspects of the invention can also include speech synthesis functionality that allows the classifier 710 to translate the result(s) 720 into natural language (text and audio) to communicate aspects of the result(s) 720 as natural language communications.

The NLP and ML algorithms 714, 712 receive and evaluate input data (i.e., training data and data-under-analysis) from the data sources 702. The ML algorithms 712 includes functionality that is necessary to interpret and utilize the input data's format. For example, where the data sources 702 include image data, the ML algorithms 712 can include visual recognition software configured to interpret image data. The ML algorithms 712 apply machine learning techniques to received training data (e.g., data received from one or more of the data sources 702) in order to, over time, create/train/update one or more models 716 that model the overall task and the sub-tasks that the classifier 710 is designed to complete.

Figure 8:
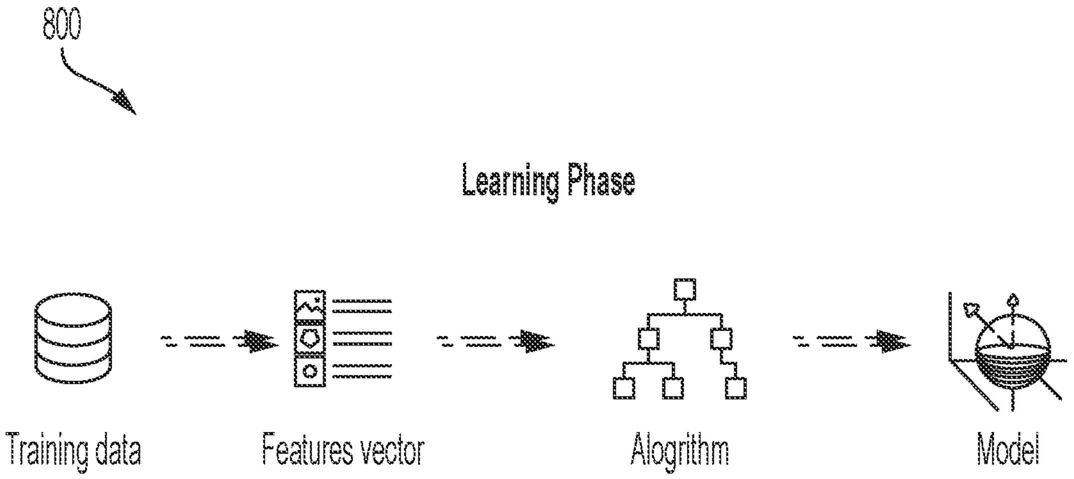
FIG. 8 depicts a learning phase that can be implemented by the machine learning system shown in FIG. 7.

Referring now to FIGS. 7 and 8 collectively, FIG. 8 depicts an example of a learning phase 800 performed by the ML algorithms 712 to generate the above-described models 716. In the learning phase 800, the classifier 710 extracts features from the training data and coverts the features to vector representations that can be recognized and analyzed by the ML algorithms 712. The features vectors are analyzed by the ML algorithm 712 to "classify" the training data against the target model (or the model's task) and uncover relationships between and among the classified training data. Examples of suitable implementations of the ML algorithms 712 include but are not limited to neural networks, support vector machines (SVMs), logistic regression, decision trees, hidden Markov Models (HMMs), etc. The learning or training performed by the ML algorithms 712 can be supervised, unsupervised, or a hybrid that includes aspects of supervised and unsupervised learning. Supervised learning is when training data is already available and classified/labeled.

Unsupervised learning is when training data is not classified/labeled so must be developed through iterations of the classifier 710 and the ML algorithms 712. Unsupervised learning can utilize additional learning/training methods including, for example, clustering, anomaly detection, neural networks, deep learning, and the like.

When the models 716 are sufficiently trained by the ML algorithms 712, the data sources 702 that generate "real world" data are accessed, and the "real world" data is applied to the models 716 to generate usable versions of the results 720. In some embodiments of the invention, the results 720 can be fed back to the classifier 710 and used by the ML algorithms 712 as additional training data for updating and/or refining the models 716.

In aspects of the invention, the ML algorithms 712 and the models 716 can be configured to apply confidence levels (CLs) to various ones of their results/determinations (including the results 720) in order to improve the overall accuracy of the particular result/determination. When the ML algorithms 712 and/or the models 716 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 710 can be configured to apply confidence levels (CLs) to the results 720. When the classifier 710 determines that a CL in the results 720 is below a predetermined threshold (TH) (i.e., CL<TH), the results 720 can be classified as sufficiently low to justify a classification of "no confidence" in the results 720. If CL>TH, the results 720 can be classified as sufficiently high to justify a determination that the results 720 are valid. Many different predetermined TH levels can be provided such that the results 720 with CL>TH can be ranked from the highest CL>TH to the lowest CL>TH.

The functions performed by the classifier 710, and more specifically by the ML algorithm 712, can be organized as a weighted directed graph, wherein the nodes are artificial neurons (e.g. modeled after neurons of the human brain), and wherein weighted directed edges connect the nodes. The directed graph of the classifier 710 can be organized such that certain nodes form input layer nodes, certain nodes form hidden layer nodes, and certain nodes form output layer nodes. The input layer nodes couple to the hidden layer nodes, which couple to the output layer nodes. Each node is connected to every node in the adjacent layer by connection pathways, which can be depicted as directional arrows that each has a connection strength. Multiple input layers, multiple hidden layers, and multiple output layers can be provided. When multiple hidden layers are provided, the classifier 710 can perform unsupervised deep-learning for executing the assigned task(s) of the classifier 710.

Similar to the functionality of a human brain, each input layer node receives inputs with no connection strength adjustments and no node summations. Each hidden layer node receives its inputs from all input layer nodes according to the connection strengths associated with the relevant connection pathways. A similar connection strength multiplication and node summation is performed for the hidden layer nodes and the output layer nodes.

The weighted directed graph of the classifier 710 processes data records (e.g., outputs from the data sources 702) one at a time, and it "learns" by comparing an initially arbitrary classification of the record with the known actual classification of the record. Using a training methodology knows as "back-propagation" (i.e., "backward propagation of errors"), the errors from the initial classification of the first record are fed back into the weighted directed graphs of the classifier 710 and used to modify the weighted directed graph's weighted connections the second time around, and this feedback process continues for many iterations. In the training phase of a weighted directed graph of the classifier 710, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the weighted directed graph's calculated values for the output nodes to these "correct" values, and to calculate an error term for each node (i.e., the "delta" rule). These error terms are then used to adjust the weights in the hidden layers so that in the next iteration the output values will be closer to the "correct" values.

FIG. 9 depicts a high level block diagram of the computer system 900, which can be used to implement one or more computer processing operations in accordance with aspects of the present invention. Although one exemplary computer system 900 is shown, computer system 900 includes a communication path 925, which connects computer system 900 to additional systems (not depicted) and can include one or more wide area networks (WANs) and/or local area networks (LANs) such as the Internet, intranet(s), and/or wireless communication network(s). Computer system 900 and the additional systems are in communication via communication path 925, e.g., to communicate data between them. In some embodiments of the invention, the additional systems can be implemented as one or more cloud computing systems 50. The cloud computing system 50 can supplement, support or replace some or all of the functionality (in any combination) of the computer system 900, including any and all computing systems described in this detailed description that can be implemented using the computer system 900. Additionally, some or all of the functionality of the various computing systems described in this detailed description can be implemented as a node of the cloud computing system 50.

Computer system 900 includes one or more processors, such as processor 902. Processor 902 is connected to a communication infrastructure 904 (e.g., a communications bus, cross-over bar, or network). Computer system 900 can include a display interface 906 that forwards graphics, text, and other data from communication infrastructure 904 (or from a frame buffer not shown) for display on a display unit 908. Computer system 900 also includes a main memory 910, preferably random access memory (RAM), and can also include a secondary memory 912. Secondary memory 912 can include, for example, a hard disk drive 914 and/or a removable storage drive 916, representing, for example, a floppy disk drive, a magnetic tape drive, or an optical disk drive. Removable storage drive 916 reads from and/or writes to a removable storage unit 918 in a manner well known to those having ordinary skill in the art. Removable storage unit 918 represents, for example, a floppy disk, a compact disc, a magnetic tape, or an optical disk, flash drive, solid state memory, etc. which is read by and written to by removable storage drive 916. As will be appreciated, removable storage unit 918 includes a computer readable medium having stored therein computer software and/or data.

In alternative embodiments of the invention, secondary memory 912 can include other similar means for allowing computer programs or other instructions to be loaded into the computer system. Such means can include, for example, a removable storage unit 920 and an interface 922. Examples of such means can include a program package and package interface (such as that found in video game devices), a removable memory chip (such as an EPROM, or PROM) and associated socket, and other removable storage units 920 and interfaces 922 which allow software and data to be transferred from the removable storage unit 920 to computer system 900.

Computer system 900 can also include a communications interface 924. Communications interface 924 allows software and data to be transferred between the computer system and external devices. Examples of communications interface 924 can include a modem, a network interface (such as an Ethernet card), a communications port, or a PCM-CIA slot and card, etcetera. Software and data transferred via communications interface 924 are in the form of signals which can be, for example, electronic, electromagnetic, optical, or other signals capable of being received by communications interface 924. These signals are provided to communications interface 924 via communication path (i.e., channel) 925. Communication path 925 carries signals and can be implemented using wire or cable, fiber optics, a phone line, a cellular phone link, an RF link, and/or other communications channels.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms “comprises,” “comprising,” “includes,” “including,” “has,” “having,” “contains” or “containing,” or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

The terminology used herein is for the purpose of describing particular embodiments of the invention only and is not intended to be limiting of the present invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

Additionally, the term “exemplary” and variations thereof are used herein to mean “serving as an example, instance or illustration.” Any embodiment or design described herein as “exemplary” is not necessarily to be construed as preferred or advantageous over other embodiments or designs. The terms “at least one,” “one or more,” and variations thereof, can include any integer number greater than or equal to one, i.e. one, two, three, four, etc. The terms “a plurality” and variations thereof can include any integer number greater than or equal to two, i.e., two, three, four, five, etc. The term “connection” and variations thereof can include both an indirect “connection” and a direct “connection.”

The terms “about,” “substantially,” “approximately,” and variations thereof, are intended to include the degree of error associated with measurement of the particular quantity based upon the equipment available at the time of filing the application. For example, “about” can include a range of ±8% or 5%, or 2% of a given value.

As used herein, in the context of machine learning algorithms, the terms “input data,” and variations thereof are intended to cover any type of data or other information that is received at and used by the machine learning algorithm to perform training, learning, and/or classification operations.

As used herein, in the context of machine learning algorithms, the terms “training data,” and variations thereof are intended to cover any type of data or other information that is received at and used by the machine learning algorithm to perform training and/or learning operations.

As used herein, in the context of machine learning algorithms, the terms “application data,” “real world data,” “actual data,” and variations thereof are intended to cover any type of data or other information that is received at and used by the machine learning algorithm to perform classification operations.

The phrases “in signal communication”, “in communication with,” “communicatively coupled to,” and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of performing an electronic search, the computer-implemented method comprising:

receiving, using a processor, a composite electronic image comprising a plurality of electronically identifiable objects, wherein the composite electronic image is associated with a user;

segmenting, using the processor, the composite electronic image into sub-images by providing at least one of the sub-images for each of the plurality of electronically identifiable objects; and using the processor to perform personalized sub-image search operations on each of the sub-images without relying on the user taking action, the personalized sub-image search operations comprising:

deciding, by the processor, a sub-image-to-be-searched from among the sub-images;

associating the sub-image-to-be-searched with personalized metadata of the user; and searching, based at least in part on the personalized metadata of the user, a database to return a set of search images.

2. The computer-implemented method of claim 1, wherein the personalized metadata of the user comprises:

a description of a relevance of the sub-image-to-be-searched to the user;

a relative size of the sub-image-to-be-searched to the composite image; and a relative position of the sub-image-to-be-searched within the composite image.

3. The computer-implemented method of claim 2, wherein the personalized metadata of the user is derived from a corpus of information about the user.

4. The computer-implemented method of claim 1, wherein the personalized sub-image search operations further comprise:

assigning a relevance level to the sub-image-to-be-searched;

wherein the relevance level comprises a relevance of the sub-image-to-be-searched to the user; and ranking the sub-image-to-be-searched against the sub-images based at least in part on the relevance level.

5. The computer-implemented method of claim 1, wherein the personalized sub-image search operations further comprise:

presenting results of the personalized sub-image search operations to the user; and receiving feedback from the user on the results of the personalized sub-image search operations.

6. The computer-implemented method of claim 5 further comprising repeating the personalized sub-image search operations for the sub-image-to-be-searched based on the feedback.

7. The computer-implemented method of claim 4, wherein the processor comprises a classifier trained to:

generate the personalized metadata of the user based on the corpus of information about the user; and determine the relevance of the sub-image-to-be-searched to the user based at least in part on the corpus of information about the user.

8. A computer system for performing an electronic search, the computer system comprising a memory communicatively coupled to a processor, the processor configured to perform processor operations comprising:

receiving a composite electronic image comprising a plurality of electronically identifiable objects, wherein the composite electronic image is associated with a user;

segmenting the composite electronic image into sub-images by providing at least one of the sub-images for each of the plurality of electronically identifiable objects; and performing personalized sub-image search operations on each of the sub-images without relying on the user taking action, the personalized sub-image search operations comprising:

deciding, by the processor, a sub-image-to-be-searched from among the sub-images;

using the processor to perform a cognitive task comprising determining a level of relevance of the sub-image-to-be-searched to the user, incorporating the level of relevance of the sub-image-to-be-searched to the user into metadata of the sub-image-to-be-searched to create personalized metadata of the user, and associating the sub-image-to-be-searched with the personalized metadata of the user; and searching, based at least in part on the personalized metadata of the user, a database to return a set of search images.

9. The computer system of claim 8, wherein the personalized metadata of the user comprises a description of a relevance of the sub-image-to-be-searched to the user.

10. The computer system of claim 9, wherein the personalized metadata of the user is derived from a corpus of information about the user.

11. The computer system of claim 8, wherein the personalized sub-image search operations further comprise:

assigning a relevance level to the sub-image-to-be-searched;

wherein the relevance level comprises the relevance of the sub-image-to-be-searched to the user; and ranking the sub-image-to-be-searched against the sub-images based at least in part on the relevance level.

12. The computer system of claim 8, wherein the personalized sub-image search operations further comprise:

presenting results of the personalized sub-image search operations to the user; and receiving feedback from the user on the results of the personalized sub-image search operations.

13. The computer system of claim 12, wherein the processor operations further comprise repeating the personalized sub-image search operations for the sub-image-to-be-searched based on the feedback.

14. The computer system of claim 11, wherein the processor comprises a classifier trained to:

generate the personalized metadata of the user based on the corpus of information about the user; and determine the relevance of the sub-image-to-be-searched to the user based at least in part on the corpus of information about the user.

15. A computer program product for performing an electronic search, the computer program product comprising a computer readable program stored on a computer readable storage medium, wherein the computer readable program, when executed on a processor, causes the processor to perform a method comprising:

receiving a composite electronic image comprising a plurality of electronically identifiable objects, wherein the composite electronic image is associated with a user;

segmenting the composite electronic image into sub-images by providing at least one of the sub-images for each of the plurality of electronically identifiable objects; and performing personalized sub-image search operations on each of the sub-images without relying on the user taking action, the personalized sub-image search operations comprising:

deciding, by the processor, a sub-image-to-be-searched from among the sub-images;

associating the sub-image-to-be-searched with personalized metadata of the user; and searching, based at least in part on the personalized metadata of the user, a database to return a set of search images.

16. The computer program product of claim 15, wherein the personalized metadata of the user comprises a description of a relevance of the sub-image-to-be-searched to the user.

17. The computer program product of claim 16, wherein the personalized metadata of the user is derived from a corpus of information about the user.

18. The computer program product of claim 15, wherein the personalized sub-image search operations further comprise:

assigning a relevance level to the sub-image-to-be-searched;

wherein the relevance level comprises the relevance of the sub-image-to-be-searched to the user; and ranking the sub-image-to-be-searched against the sub-images based at least in part on the relevance level.

19. The computer program product of claim 15, wherein the personalized sub-image search operations further comprise:

presenting results of the personalized sub-image search operations to the user; and receiving feedback from the user on the results of the personalized sub-image search operations;

wherein the processor operations further comprise repeating the personalized sub-image search operations for the sub-image-to-be-searched based on the feedback.

20. The computer program product of claim 18, wherein the processor comprises a classifier trained to:

generate the personalized metadata of the user based on the corpus of information about the user; and determine a relevance of the sub-image-to-be-searched to the user based at least in part on the corpus of information about the user.

* * * * *